(12) United States Patent
Kanno et al.

(10) Patent No.: US 8,486,159 B2
(45) Date of Patent: Jul. 16, 2013

(54) METHOD FOR PRODUCING POSITIVE ELECTRODE ACTIVE MATERIAL AND POSITIVE ELECTRODE ACTIVE MATERIAL

(75) Inventors: Ryoji Kanno, Yokohama (JP); Masaaki Hirayama, Yokohama (JP); Takayuki Kaneko, Yokohama (JP); Yuichiro Imanari, Tsukuba (JP); Kenji Nakane, Tsukuba (JP)

(73) Assignees: Tokyo Institute of Technology, Tokyo (JP); Sumitomo Chemical Company, Limited, Tokyo (JP)

( * ) Notice: Subject to any disclaimer, the term of this patent is extended or adjusted under 35 U.S.C. 154(b) by 624 days.

(21) Appl. No.: 12/651,578

(22) Filed: Jan. 4, 2010

(65) Prior Publication Data
US 2010/0216024 A1 Aug. 26, 2010

(30) Foreign Application Priority Data

Feb. 26, 2009 (JP) ................. 2009-044508

(51) Int. Cl.
*H01M 4/82* (2006.01)
*H01M 4/13* (2010.01)
(52) U.S. Cl.
USPC ................... 29/623.1; 429/231.95
(58) Field of Classification Search
USPC ............. 429/122, 188, 304, 321–322, 209, 429/218.1, 218.2, 220, 223–224, 231.9–231.95; 29/623.1
See application file for complete search history.

(56) References Cited

U.S. PATENT DOCUMENTS

| | | | | |
|---|---|---|---|---|
| 4,732,751 A | * | 3/1988 | Salmon | 423/641 |
| 5,478,672 A | * | 12/1995 | Mitate | 429/224 |
| 2001/0031401 A1 | | 10/2001 | Yamawaki et al. | |
| 2002/0045098 A1 | * | 4/2002 | Tabuchi et al. | 429/221 |

FOREIGN PATENT DOCUMENTS

| | | |
|---|---|---|
| JP | 2001-213622 A | 8/2001 |
| JP | 2005-71807 A | 3/2005 |

OTHER PUBLICATIONS

Japanese Office Action dated Apr. 23, 2013 issued in Japanese Application No. 2009-044508.

* cited by examiner

*Primary Examiner* — Barbara Gilliam
*Assistant Examiner* — Claire L. Roe
(74) *Attorney, Agent, or Firm* — Sughrue Mion, PLLC

(57) ABSTRACT

The object of the present invention is to provide a method for producing simply a positive electrode active material which can further increase charge-discharge capacity of secondary batteries when the positive electrode active material is used for positive electrode of secondary batteries, particularly non-aqueous electrolyte secondary batteries. A method for producing a positive electrode active material includes the step of heat-treating a lithium mixed metal oxide represented by the formula $Li_2MO_3$ in the presence of a hydride wherein M is at least one element selected from the group consisting of Ti, V, Mn, Fe, Co and Ni.

19 Claims, 1 Drawing Sheet

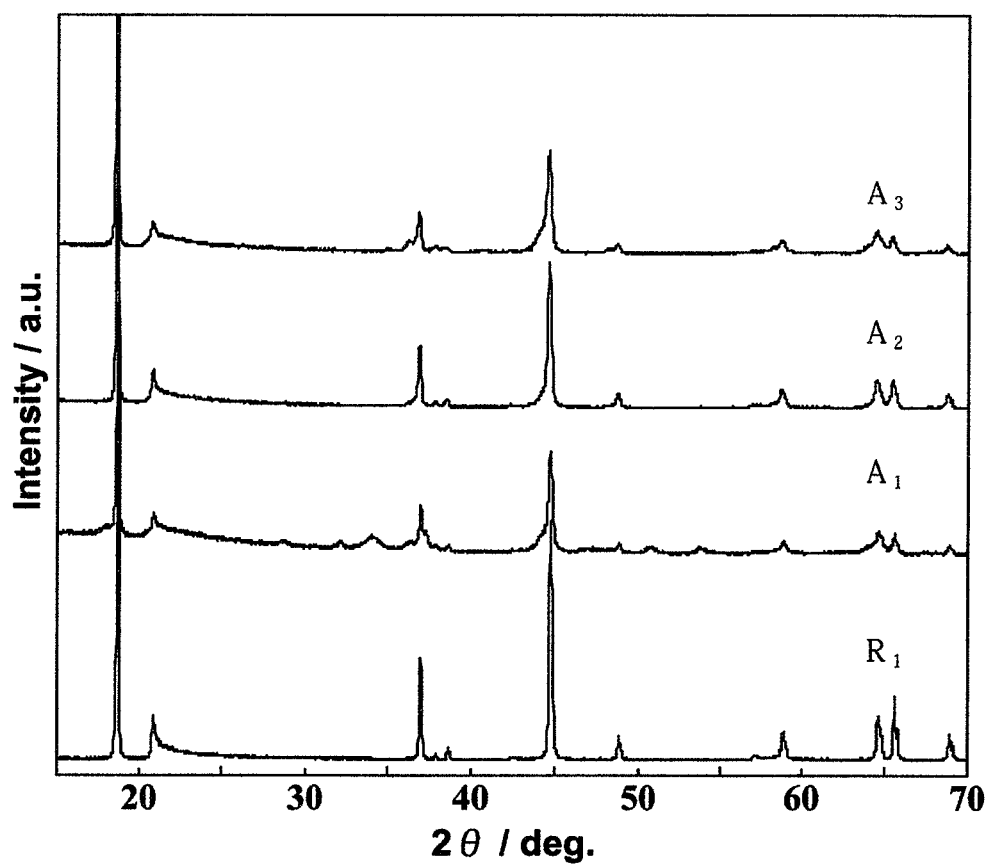

METHOD FOR PRODUCING POSITIVE ELECTRODE ACTIVE MATERIAL AND POSITIVE ELECTRODE ACTIVE MATERIAL

FIELD OF THE INVENTION

The present invention relates to a method for producing a positive electrode active material. More particularly, it relates to a method for producing a positive electrode active material used for positive electrodes for non-aqueous electrolyte secondary batteries.

BACKGROUND OF THE INVENTION

Positive electrode active materials are used for positive electrodes of secondary batteries such as non-aqueous electrolyte secondary batteries. Secondary batteries have been practically utilized as electric sources of portable phones, notebook personal computers, etc., and furthermore are tentatively used for medium and large scale uses such as uses for automobiles and uses for storing electric power.

Conventionally known positive electrode active materials are represented by the formula $Li_{2-x}Mn_{1-y}M_yO_{3-z}$, wherein M is at least one element selected from the group consisting of Fe, Al, Ni and Co, and x, y and z satisfy $0<x\leqq0.9$, $0\leqq y\leqq0.5$ and $0<z\leqq0.9$), and Patent Document 1 discloses the positive electrode active materials are used for aqueous electrolyte lithium secondary batteries. Patent Document 1 discloses that Mn in $Li_2MnO_3$ is tetravalent and stable, Li ion is hardly eliminated and is electrochemically stable and hence charge-discharge reaction does not generally occur, while the positive electrode active material of the above formula in which oxygen is deficient and Mn is lower than tetravalent, and elimination of Li ion becomes possible until Mn becomes tetravalent. Thus, reversible charge-discharge reaction can occur. Patent Document 1 further discloses a method for producing the positive electrode active material of the above formula which comprises charging in a closed vessel a mixed solution in which a precursor of the positive electrode active material of the above formula is precipitated, and irradiating the vessel with electromagnetic wave of 2.45 GHz with keeping the temperature at 100° C., followed by filtration, water washing and drying.

(Patent Document 1) JP-A-2005-71807 (claims and paragraphs [0018] and [0032])

BRIEF SUMMARY OF THE INVENTION

However, the positive electrode active material obtained by the above production method is suitable for positive electrode of aqueous electrolyte lithium secondary batteries, but when this is used for positive electrode of non-aqueous electrolyte secondary batteries, they are not sufficient from the viewpoint of charge-discharge capacity. The object of the present invention is to provide a method for producing a positive electrode active material which gives non-aqueous electrolyte secondary batteries capable of showing sufficient charge-discharge capacity.

As a result of an intensive research conducted by the inventors, it has been found that the following production method can attain the above object, and the present invention has been accomplished.

That is, the present invention provides the following <1>-<11>.

<1> A method for producing a positive electrode active material, comprising the step of heat-treating a lithium mixed metal oxide represented by the formula $Li_2MO_3$ in the presence of a hydride, wherein M is at least one element selected from the group consisting of Ti, V, Mn, Fe, Co and Ni.

<2> The method according to <1> wherein M contains Mn.

<3> The method according to <2> wherein M further contains Co and/or Ni.

<4> The method according to <1> wherein the hydride is a metal hydride.

<5> The method according to <4> wherein the metal hydride is $CaH_2$.

<6> The method according to <1> wherein the heat treatment is carried out in an inert gas atmosphere.

<7> The method according to <6> wherein the heat treatment is carried out under a pressure of not higher than $10^3$ Pa.

<8> The method according to <1> wherein the heat treatment is carried out at a temperature in the range of not lower than 100° C. and not higher than 1000° C.

<9> A positive electrode active material obtained by the method according to any one of <1> to <8>.

<10> A positive electrode for non-aqueous electrolyte secondary battery comprising the positive electrode active material according to <9>.

<11> A non-aqueous electrolyte secondary battery comprising the positive electrode for non-aqueous electrolyte secondary battery according to <10>.

ADVANTAGES OF THE INVENTION

Using the method of the present invention, a positive electrode active material capable of further enhancing the charge-discharge capacity of non-aqueous electrolyte secondary battery can be produced.

BRIEF DESCRIPTION OF THE DRAWINGS

FIG. 1 shows powder X-ray diffraction patterns of positive electrode active materials in Examples 1-3 ($A_1$-$A_3$) and Comparative Example 1 ($R_1$).

DETAILED DESCRIPTION OF THE INVENTION

Method for Producing Positive Electrode Active Material

The present invention provides a method for producing a positive electrode active material which comprises the step of heat-treating a lithium mixed metal oxide represented by the formula $Li_2MO_3$ in the presence of a hydride.

The lithium mixed metal oxide has the crystal structure of $Li_2MO_3$ type and usually of monoclinic system. The crystal structure can be determined by powder X-ray diffractometry or electron diffractometry.

In the formula, M is at least one element selected from the group consisting of Ti, V, Mn, Fe, Co and Ni. M preferably contains Mn so that a non-aqueous secondary battery to be obtained by using the positive electrode active material tends to have a large charge-discharge capacity. M further preferably contains Co and/or Ni in addition to Mn so that the non-aqueous secondary battery tends to have a larger charge-discharge capacity.

Furthermore, so long as the effects of the present invention are not reduced, Li and/or M in the lithium mixed metal oxide may be partially replaced with a doping element such as B, Al, Ga, In, Ge, Mg, Si, and P.

The lithium mixed metal oxide ($Li_2MO_3$) can be prepared by conventional methods such as solid phase preparation, liquid phase preparation and gas phase preparation using respective metal in such a manner as providing the desired composition or a compound containing the metal as a starting material.

Preferable method is the solid phase preparation, specifically a preparing method in which starting materials containing the respective metals of the lithium mixed metal oxide ($Li_2MO_3$) are mixed and then fired.

The starting material for preparing the lithium mixed metal oxide ($Li_2MO_3$) is not particularly limited as far as it is simple substance or compound containing each of Li and M. Examples of the compound include oxides, hydroxides, halides, carbonates, nitrates, sulfates, oxalates, and acetates.

The compounds containing the metals at a prescribed ratio (Li:M=2:1 (molar ratio)) are mixed to obtain a metal compound mixture. The mixing may be carried out by any of dry mixing and wet mixing, preferably by dry mixing in viewpoint of simplicity. The mixing can be carried out by using dry mixers such as a V blender, a W blender, a ribbon blender, a drum mixer, and a dry ball mill.

The metal compound mixture can be fired at a temperature of not lower than 600° C. and not higher than 1100° C. for from 2 to 100 hours, followed by being optionally compression molded to obtain a lithium mixed metal oxide ($Li_2MO_3$). The pressure for the compression molding is preferably of from not lower than 0.1 MPa to not higher than 50 MPa. The firing atmosphere contains air, oxygen, nitrogen, argon or mixture thereof, preferably oxygen. The firing may be carried out under pressure.

For example, the lithium mixed metal oxide represented by the formula $LiMnO_3$ which is one of preferred compositions can be prepared by a method in which lithium carbonate ($Li_2CO_3$) and manganese carbonate ($MnCO_3$) are weighed so as to give a molar ratio of Li:Mn of 2:1, mixed to obtain a metal compound mixture, and the mixture is fired at from 700 to 900° C. for from 0.5 to 50 hours in an oxygen atmosphere.

The lithium mixed metal oxide may be ground by using a ball mill, a jet mill, or the like. The grinding and firing may be repeated two or more times. The lithium mixed metal oxide can be optionally washed or classified.

The positive electrode active material can be produced through the step of heat-treating the lithium mixed metal oxide ($Li_2MO_3$) in the presence of a hydride.

The hydride can reduce the lithium mixed metal oxide when heat treatment is carried out in the presence of the lithium mixed metal oxide, and it may be either a metal hydride or a non-metal hydride and is preferably a metal hydride for attaining high activity.

Examples of the non-metal hydride include hydrogen ($H_2$), ammonia ($NH_3$), hydrogen selenide ($H_2Se$), and hydrogen sulfide ($H_2S$). The non-metal hydrides are usually gaseous and may be used as an atmospheric gas in heat-treating the lithium mixed metal oxide.

Examples of the metal hydride include alkali metal hydrides such as lithium hydride (LiH), sodium hydride (NaH) and potassium hydride (KH); alkaline earth metal hydrides such as magnesium hydride ($MgH_2$), calcium hydride ($CaH_2$), strontium hydride ($SrH_2$) and barium hydride ($BaH_2$); boron hydride ($BH_3$); alkali metal borohydrides such as sodium borohydride ($NaBH_2$); aluminum hydride ($AlH_3$); gallium hydride ($GaH_3$); alkali metal aluminum hydride compounds such as lithium aluminum hydride. These may be used singly or in combination with another or more. The metal hydrides are usually solid and may be mixed with the lithium mixed metal oxide, and heat-treated.

Among these metal hydrides, alkali metal hydride and/or alkaline earth metal hydride are preferable for efficiently producing the positive electrode active material, and $CaH_2$ is more preferable in view of excellent operability.

In the present invention, the heat treatment atmosphere is preferably an inert gas atmosphere so that the lithium mixed metal oxide can be efficiently reduced, and a large charge-discharge capacity can readily be obtained by using the active material for positive electrode of secondary battery. Examples of the inert gas include $N_2$ gas, He gas, Ne gas and Ar gas, preferably $N_2$ gas in view of cost advantage. The heat treatment is carried out preferably under reduced pressure, and specifically, it is carried out under a pressure of preferably not higher than $10^3$ Pa, more preferably not higher than $10^2$ Pa. The heat treatment temperature is preferably not lower than 100° C. and not higher than 1000° C., more preferably not lower than 150° C. and not higher than 500° C. The heat treatment may be carried out by heating at a temperature in the above range.

Generally a hydride often reacts with water and oxygen, and when it is mixed with the hydride and the lithium mixed metal oxide, mixing is preferably carried out in an inert gas atmosphere such as nitrogen and argon. Mixing can be used with the same dry mixer as mentioned above.

The mixture of lithium mixed metal oxide and hydride is heat-treated at a temperature of not lower than 100° C. and not higher than 1000° C. for from 0.1 to 50 hours followed by being optionally compression molded. The heat-treated product is washed to remove impurities and then dried to obtain the positive electrode active material of the present invention. Preferable examples of the solvent used for washing include dehydrated polar solvents other than water (dehydrated alcohol and dehydrated acetone).

The mixture of lithium mixed metal oxide and hydride may further contain a compound containing an element such as B, Al, Ga, In, Ge, Mg, Si, and P as far as the effects of the present invention are not reduced.

In the step of heat-treating the mixture of lithium mixed metal oxide and hydride, a lithium manganese mixed metal oxide ($Li_2MnO_3$) and calcium hydride ($CaH_2$) are weighed so as to give a weight ratio of $Li_2MnO_3$ and $CaH_2$ of 1:2 to obtain a mixed powder. The mixed powder is charged into a glass tube. The pressure in the glass tube is reduced and then ends of the glass tube is sealed. The sealed glass tube is heat-treated at 300° C. The mixed powder is recovered after cooling, washed and dried to obtain the positive electrode active material of the present invention.

The positive electrode active material is a lithium mixed metal oxide produced by partial reduction of the lithium mixed metal oxide with hydride.

The positive electrode active material is suitable as a positive electrode active material for positive electrode of secondary batteries such as aqueous electrolyte secondary battery and non-aqueous electrolyte secondary battery, and is more suitable as a positive electrode active material for positive electrode of non-aqueous electrolyte secondary batteries.

Positive Electrode

A positive electrode for non-aqueous electrolyte secondary batteries comprising the positive electrode active material will be illustrated.

The positive electrode for non-aqueous electrolyte secondary batteries can be produced by coating a positive electrode current collector with a positive mixture containing the positive electrode active material and optionally a conducting material and a binder. The positive electrode for non-aqueous electrolyte secondary batteries comprises the positive electrode active material.

As the conducting materials, carbon materials can be used. Examples of the carbon materials include graphite powder, carbon black (e.g., acetylene black), and fibrous carbon materials (such as carbon nanotubes and carbon nanofibers). Since the carbon black (e.g., acetylene black) is in the form of fine particle and has a large specific surface area, even if a small amount of carbon black is added to the positive mixture, the positive electrode has an increased conductivity and is excellent in charge-discharge efficiency and rate characteristics. The excessive amount of carbon black may degrade adhesion between the positive mixture and the positive electrode current collector given by binder to cause rather decrease in internal resistance. The proportion of the conducting material in the positive mixture is usually not less than 5% by weight and not more than 20% by weight. When the fibrous carbon materials are used as the conducting materials, the proportion can be reduced.

As the binder, a thermoplastic resin can be used. Examples of the resin include fluororesins such as polyvinylidene fluoride (hereinafter sometimes referred to as "PVDF"), polytetrafluoroethylene (hereinafter sometimes referred to as "PTFE"), ethylene tetrafluoride•propylene hexafluoride•vinylidene fluoride copolymers, propylene hexafluoride•vinylidene fluoride copolymers, and ethylene tetrafluoride•perfluorovinyl ether copolymers, and polyolefin resins such as polyethylene and polypropylene. These may be used singly or in combination with another or more. A positive mixture excellent in adhesion to the positive electrode current collector can be obtained by using fluororesin and polyolefin resin as the binder in such a manner that the proportion of the fluororesin to the positive mixture is from 1 to 10% by weight and that of the polyolefin resin to the positive mixture is from 0.1 to 2% by weight.

As the positive electrode current collector, Al, Ni, or stainless steel may be used. and Al is preferable for being easily worked to a thin film and inexpensive. As a method for coating the positive electrode current collector with the positive mixture, there may be used a method of pressure molding, a method of preparing a paste containing the positive mixture using an organic solvent or the like, coating the positive electrode current collector with the paste to form a coat and drying the coat, followed by pressing. The paste is prepared from a slurry containing the positive electrode active material, a conducting material, a binder and an organic solvent. Examples of the organic solvent include amine solvents such as N,N-dimethylaminopropylamine and diethylenetriamine, ether solvents such as tetrahydrofuran, ketone solvents such as methyl ethyl ketone, ester solvents such as methyl acetate, and amide solvents such as dimethylacetamide and 1-methyl-2-pyrrolidone.

The positive electrode current collector is coated with the positive electrode mixture, for example, by slit die coating, screen coating, curtain coating, knife coating, gravure coating, electrostatic spraying, or the like. The positive electrode for non-aqueous electrolyte secondary batteries can be produced by these methods.

A non-aqueous electrolyte secondary battery can be produced in the following manner using the positive electrode for non-aqueous electrolyte secondary batteries. Specifically, a separator, a negative electrode formed by coating a negative electrode current collector with a negative mixture, and the positive electrode are laminated and the laminate is rolled to obtain an electrode group. The electrode group is stored in a battery case, followed by impregnating the electrode group with an electrolyte solution containing an organic solvent and an electrolyte, thereby to obtain the non-aqueous electrolyte secondary battery.

The electrode group has the shape such that when the electrode group is cut in perpendicular direction to the axis of roll, and the sectional shape of circle, ellipse, rectangle or rectangle from which corners are chamfered. The battery has the shape of, for example, paper type, coin type, cylindrical type, and rectangular type.

As the negative electrode, there may be used a negative electrode current collector coated with a negative mixture containing a material capable of doping and releasing lithium ions. Examples of the negative electrode include lithium metal or a lithium alloy. Examples of the material capable of doping and releasing lithium ions include carbon materials such as natural graphite, artificial graphite, cokes, carbon black, pyrolytic carbons, carbon fibers, and fired products of organic polymer compounds. There may also be used chalcogen compounds such as oxides and sulfides capable of doping and releasing lithium ions at an electric potential lower than that of the positive electrode. As the carbon material, there may be used carbon material mainly composed of graphite such as natural graphite and artificial graphite because of their high potential evenness and low average discharge potential. The carbon material has any shapes and, for example, the shape of flake such as of natural graphite, sphere such as of meso-carbon microbeads, fiber such as of graphitized carbon fibers, and aggregate of fine powders. When the electrolyte solution does not contain ethylene carbonate referred to hereinafter, use of a negative mixture containing polyethylene carbonate can sometimes improve cycle characteristics and large current discharging characteristics of the battery.

The negative mixture may contain a binder. The binder is, for example, a thermoplastic resin. Examples thereof include PVDF, thermoplastic polyimides, carboxymethyl cellulose, polyethylene, and polypropylene.

As the chalcogen compounds such as oxides and sulfides used as the materials capable of doping and releasing lithium ions contained in the negative mixture, chalcogen compounds such as crystalline or non-crystalline oxides and sulfides mainly composed of the elements of Groups 13, 14 and 15 of the periodic table are used. Examples of the chalcogen compounds include non-crystalline compounds mainly composed of tin oxide. These chalcogen compounds may contain a carbon material as a conducting material.

Examples of the negative electrode current collectors include Cu, Ni, and stainless steel, preferably Cu in view of hardly being able to form an alloy with lithium and being easily worked to thin film. The negative electrode current collector can be coated with the negative mixture in the same manner as positive electrode by, for example, a method of pressure molding, a method of preparing a paste using an organic solvent or the like, coating the negative electrode current collector with the paste to form a coat and drying the coat, followed by pressing to bond the coat to the current collector, and others.

As separators, there may be used materials having the shape of porous film, nonwoven fabric, woven fabric, or the like which contain polyolefin resins such as polyethylene and polypropylene, fluororesins, and nitrogen-containing aromatic polymers. The separators may contain two or more of the materials. The laminate separators comprising two or more layers differing in the materials are also used. As the laminate separators, those which comprise nitrogen-containing aromatic polymer layer and polyethylene layer are suitable for secondary batteries in view of heat resistance and shut-down performance. The separators are disclosed in, for example, JP-A-2000-30686 and JP-A-10-324758. The thickness of the separators is preferably as thin as possible so long as mechanical strength can be maintained since volumetric energy density increases and internal resistance of the battery decreases. The thickness is usually about from 10 to 200 μm, preferably about from 10 to 30 μm.

Examples of the electrolyte in the electrolyte solution include lithium salts such as $LiClO_4$, $LiPF_6$, $LiAsF_6$, $LiSbF_6$, $LiBF_4$, $LiCF_3SO_3$, $LiN(SO_2CF_3)_2$, $LiC(SO_2CF_3)_3$, $Li_2B_{10}Cl_{10}$, lower aliphatic carboxylic acid lithium salts, and $LiAlCl_4$. These may be used singly or in combination with another or more. Among the lithium salts, there are usually used those which contain at least one selected from the group consisting of $LiPF_6$, $LiAsF_6$, $LiSbF_6$, $LiBF_4$, $LiCF_3SO_3$, $LiN(SO_2CF_3)_2$ and $LiC(SO_2CF_3)_3$ which contain fluorine.

In the electrolyte solution, examples of the organic solvents include carbonates such as propylene carbonate, ethylene carbonate, dimethyl carbonate, diethyl carbonate, ethylmethyl carbonate, 4-trifluoromethyl-1,3-dioxolan-2-one and 1,2-di(methoxycarbonyloxy)ethane; ethers such as 1,2-dimethoxyethane, 1,3-dimethoxypropane, pentafluoropropylmethyl ether, 2,2,3,3-tetrafluoropropyldifluoromethyl ether, tetrahydrofuran and 2-methyltetrahydrofuran; esters such as methyl formate, methyl acetate and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide and 1,3-propanesultone, and these organic solvents to which a fluorine substituent is introduced. Usually, two or more of them are used in admixture. Among them, mixed solvents containing carbonates are preferable, and mixed solvents of cyclic carbonates and acyclic carbonates or cyclic carbonates and ethers are more preferable. As the mixed solvents of cyclic carbonates and acyclic carbonates, mixed solvents containing ethylene carbonate, dimethyl carbonate and ethylmethyl carbonate are preferable in view of a wide operating temperature range, are being excellent in load characteristics, and hardly decomposable even when graphite materials such as natural graphite and artificial graphite are used as active material of negative electrode. For attaining higher safety improving effect, it is preferable to use electrolyte solutions containing lithium salt containing fluorine such as $LiPF_6$ and organic solvent containing fluorine substituent. A mixed solvent containing an ether having fluorine substituent such as pentafluoropropylmethyl ether or 2,2,3,3-tetrafluoropropyldifluoromethyl ether and dimethyl carbonate is further preferable in view of being excellent also in large current discharge characteristics.

In place of the electrolyte solutions, solid electrolytes may be used. As the solid electrolytes, there can be used polymeric electrolytes such as polyethylene oxide polymer compounds and polymer compounds containing at least one of polyorganosiloxane chain and polyoxyalkylene chain. Moreover, so-called gel type electrolytes obtained by holding non-aqueous electrolyte solution in polymers. The safety can sometimes be further enhanced by using sulfide electrolytes such as $Li_2S$—$SiS_2$, $Li_2S$—$GeS_2$, $Li_2S$—$P_2S_5$, and $Li_2S$—$B_2S_3$, or inorganic compound electrolytes containing sulfides such as $Li_2S$—$SiS_2$—$Li_3PO_4$, and $Li_2S$—$SiS_2$—$Li_2SO_4$.

EXAMPLES

The present invention will be illustrated in more detail by the following examples.

The powder X-ray diffraction pattern was determined by the following method. The coin type battery used for charge-discharge test was made by the following method.

1. Powder X-ray Diffraction Pattern

The powder X-ray diffraction pattern was determined using ROTARFLEX RU-200B manufactured by RIGAKU K.K. The powder was filled in a sample holder, and measurement was carried out using CuKα source monochromatized by a single crystal curved monochrometer at an angle of diffraction (2θ) in the range of 10°-70°.

2. Production of Coin Type Battery Used for Charge-Discharge Test

A positive electrode active material mentioned hereinafter in Examples was vacuum dried at 120° C., and the active material and acetylene black (manufactured by Denki Kagaku Kogyo K.K.) as a conducting material were weighed at a weight ratio of 8:2, and mixed to obtain a powder. The powder and PTFE powder (manufactured by Kureha Chemical Industry Co., Ltd.) as a binder were weighed at a weight ratio of 10:1 and mixed to a mixture. The mixture was molded into pellets of 11 mmφ and the pellets and an aluminum mesh (current collector) of 16 mmφ were pressed together under 40 MPa to improve current collectability, thereby integrating them to obtain a positive electrode.

The positive electrode was combined with a solution prepared by dissolving $LiPF_6$ in propylene carbonate (hereinafter sometimes referred to as "PC") at a concentration of 1 mol/liter (hereinafter sometimes referred to as "$LiPF_6$/PC") as an electrolyte solution, a punched polypropylene porous film of 17 mmφ as a separator, and a punched lithium metal of 12 mmφ as a negative electrode to produce a 2032 type coin battery.

3. Charge-Discharge Test

Charge-discharge test was carried out using the coin battery by constant current charge and constant current discharge under the following conditions.

<Cell Structure> Bipolar Type

Positive electrode: An electrode containing the positive electrode active material Negative electrode: An electrode containing lithium metal Electrolyte solution: 1M $LiPF_6$/PC <Charge-Discharge Conditions>

Maximum charging voltage 4.9 V,

Charging current $6.32\times10^{-2}$ mA/cm$^2$

Minimum discharging voltage 2.0 V,

Discharging current $6.32\times10-2$ mA/cm$^2$

Example 1

As starting materials, lithium carbonate ($Li_2CO_3$) and manganese carbonate ($MnCO_3$) were weighed at a molar ratio of Li:Mn of 2:1 and mixed to obtain a mixture. The mixture was molded into pellets. The pellets were put in an aluminum boat and fired at 800° C. for 24 hours in an oxygen atmosphere. The fired product was ground in a mortar to obtain powder $R_1$. The crystal structure of $R_1$ was determined by powder X-ray diffractometry. The crystal structure was $Li_2MnO_3$ type. See FIG. 1.

In a glovebox filled with Ar gas, powder $R_1$ ($Li_2MnO_3$) and calcium hydride ($CaH_2$) were weighed at a molar ratio of $Li_2MnO_3$:$CaH_2$ of 1:2 and mixed to obtain a mixture. The mixture was molded into pellets. The pellets were charged into a Pyrex (trademark) glass tube having 13 mmφ and a length of 150 mm. The pressure in the glass tube was reduced to 210 Pa, and the glass tube was vacuum sealed under that pressure. Then, the vacuum sealed glass tube was taken out from the glovebox, and heat-treated at 300° C. for 24 hours. The heat-treated product was ground using a mortar in a glove box, washed with dehydrated ethanol, taken out from the glove box, and dried to obtain powder $A_1$.

The crystal structure of powder $A_1$ was determined by powder X-ray diffractometry. The result (diffraction pattern) was shown in FIG. 1. The diffraction pattern showed a diffraction peak at around 2θ=45° and a shape having a foot portion trailing on the lower angle side. The diffraction pattern of $A_1$ was different from $R_1$.

A 2032 type coin battery was produced using $A_1$, and charge-discharge test was carried out on the coin battery. The coin battery had charge-discharge capacities (mAh/g) at the initial cycle of 140 and 90, respectively.

Example 2

Except that the pressure in the glass tube was reduced to 50 Pa, the procedure of Example 1 was repeated to obtain powder $A_2$.

The crystal structure of powder $A_2$ was determined by powder X-ray diffractometry. The result (diffraction pattern) was shown in FIG. 1. The diffraction pattern showed a diffraction peak at around 2θ=45° and a shape as having a foot portion trailing on the lower angle side. The diffraction pattern of $A_2$ was different from $R_1$.

A 2032 type coin battery was produced using $A_2$, and charge-discharge test was carried out on the coin battery. The coin battery had charge-discharge capacities (mAh/g) at the initial cycle of 371 and 269, respectively.

Example 3

Except that the pressure in the glass tube was reduced to 15 Pa and the heat treating temperature was 310° C., the procedure of Example 1 was repeated to obtain powder $A_3$.

The crystal structure of powder $A_3$ was determined by powder X-ray diffractometry. The result (diffraction pattern) was shown in FIG. 1. The diffraction pattern showed a diffraction peak at around 2θ=45° and a shape as having a foot portion trailing on the lower angle side. The diffraction pattern of $A_3$ was different from $R_1$.

A 2032 type coin battery was produced using $A_3$, and charge-discharge test was carried out on the coin battery. The coin battery had charge-discharge capacities (mAh/g) at the initial cycle of 341 and 237, respectively.

Comparative Example 1

A 2032 type coin battery was produced using the powder $R_1$ in Example 1, and charge-discharge test was carried out on the coin battery. The coin battery had charge-discharge capacities (mAh/g) at the initial cycle of 50 and 35, respectively.

INDUSTRIAL APPLICABILITY

Using the method of the present invention, a positive electrode active material suitable for non-aqueous electrolyte secondary batteries can be simply produced. The positive electrode active material is useful particularly for non-aqueous electrolyte secondary batteries with high energy density, specifically, non-aqueous electrolyte secondary batteries for multi-functional miniature portable instruments, automobiles, electric tools.

The invention claimed is:

1. A method for producing a positive electrode active material, comprising the step of heat-treating a lithium mixed metal oxide represented by the formula $Li_2MO_3$ in the presence of a hydride, wherein M contains Mn and further contains Co and/or Ni.

2. The method according to claim 1 wherein the hydride is a metal hydride.

3. The method according to claim 2 wherein the metal hydride is $CaH_2$.

4. The method according to claim 1 wherein the heat treatment is carried out in an inert gas atmosphere.

5. The method according to claim 4 wherein the heat treatment is carried out under a pressure of not higher than $10^3$ Pa.

6. The method according to claim 1 wherein the heat treatment is carried out at a temperature of not lower than 100° C. and not higher than 1000° C.

7. A positive electrode active material which is obtained by the method according to claim 1.

8. A positive electrode for non-aqueous electrolyte secondary batteries comprising the positive electrode active material according to claim 7.

9. A non-aqueous electrolyte secondary battery comprising the positive electrode for non-aqueous electrolyte secondary batteries according to claim 8.

10. A method for producing a positive electrode active material, comprising the step of heat treating a lithium mixed metal oxide represented by the formula $Li_2MO_3$ in the presence of a metal hydride, wherein M is at least one element selected from the group consisting of Ti, V, Mn, Fe, Co and Ni.

11. The method according to claim 10 wherein M contains Mn.

12. The method according to claim 11 wherein M further contains Co and/or Ni.

13. The method according to claim 10 wherein the metal hydride is $CaH_2$.

14. The method according to claim 10 wherein the heat treatment is carried out in an inert gas atmosphere.

15. The method according to claim 14 wherein the heat treatment is carried out under a pressure of not higher than $10^3$ Pa.

16. The method according to claim 10 wherein the heat treatment is carried out at a temperature of not lower than 100° C. and not higher than 1000° C.

17. A positive electrode active material which is obtained by the method according to claim 10.

18. A positive electrode for non-aqueous electrolyte secondary batteries comprising the positive electrode active material according to claim 17.

19. A non-aqueous electrolyte secondary battery comprising the positive electrode for non-aqueous electrolyte secondary batteries according to claim 18.

* * * * *